United States Patent
Gstach et al.

(10) Patent No.: US 11,572,911 B2
(45) Date of Patent: Feb. 7, 2023

(54) EXPANSION ANCHOR

(71) Applicant: Hilti Aktiengesellschaft, Schaan (LI)

(72) Inventors: Peter Gstach, Schaan (LI); Bernhard Winkler, Feldkirch (AT); Patrick Scholz, Buchs (CH); Matteo Spampatti, Buchs (CH); Michael Sproewitz, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 620 days.

(21) Appl. No.: 15/561,630

(22) PCT Filed: Mar. 22, 2016

(86) PCT No.: PCT/EP2016/056205
§ 371 (c)(1),
(2) Date: Sep. 26, 2017

(87) PCT Pub. No.: WO2016/156100
PCT Pub. Date: Oct. 6, 2016

(65) Prior Publication Data
US 2018/0073537 A1 Mar. 15, 2018

(30) Foreign Application Priority Data
Mar. 27, 2015 (EP) .................................. 15161414

(51) Int. Cl.
*F16B 13/06* (2006.01)
(52) U.S. Cl.
CPC ................... *F16B 13/065* (2013.01)
(58) Field of Classification Search
CPC .............................. F16B 13/065; F16B 13/066
(Continued)

(56) References Cited

U.S. PATENT DOCUMENTS

| 696,587 A | * | 4/1902 | Palmer ................ F16B 13/066 411/65 |
| 1,108,656 A | * | 8/1914 | Adler .................. F16B 13/066 411/53 |

(Continued)

FOREIGN PATENT DOCUMENTS

| CN | 1078761 A | 11/1993 |
| CN | 1176351 A | 3/1998 |

(Continued)

OTHER PUBLICATIONS

Wikipedia Article "Nut (Technik)", May 5, 2014, 7.25 am, downloaded on Aug. 8, 2018, https://de.wikipedia.org/w/index.php?title=Nut_(Technik)&oldid= 1301 07183, see machine translation.

*Primary Examiner* — Flemming Saether
(74) *Attorney, Agent, or Firm* — Davidson, Davidson & Kappel, LLC

(57) ABSTRACT

An expansion anchor is provided, which is fixable in a borehole, including an expansion sleeve for anchoring on a wall of the borehole and including an anchor bolt which is guided through the expansion sleeve and which has an expansion area for expanding the expansion sleeve, the expansion sleeve having a first annular groove on its outside, which extends up to the front end face of the expansion sleeve facing the expansion area. According to the invention, it is provided that the expansion sleeve has a second annular groove on its outside, and that an annular connection piece is situated between the first annular groove and the second annual groove.

8 Claims, 1 Drawing Sheet

(58) Field of Classification Search
USPC .................................................. 411/71–74
See application file for complete search history.

(56) References Cited

U.S. PATENT DOCUMENTS

| | | | |
|---|---|---|---|
| 3,698,278 A | | 10/1972 | Trembley et al. |
| 3,813,986 A | * | 6/1974 | McVittie ............... F16B 13/066 |
| | | | 411/53 |
| 3,848,506 A | * | 11/1974 | Zifferer ................ F16B 13/124 |
| | | | 411/17 |
| 4,482,277 A | | 11/1984 | Schiefer et al. |
| 4,640,654 A | * | 2/1987 | Fischer ................ F16B 13/066 |
| | | | 411/55 |
| 4,773,803 A | * | 9/1988 | Huegel ................ F16B 13/065 |
| | | | 411/55 |
| 4,898,505 A | | 2/1990 | Froehlich et al. |
| 4,929,134 A | | 5/1990 | Bergner |
| 4,983,082 A | | 1/1991 | Mark |
| 4,984,945 A | | 1/1991 | Bergner |
| 5,263,803 A | | 11/1993 | Anquetin et al. |
| 5,332,346 A | | 7/1994 | Shinjo |
| 5,791,846 A | * | 8/1998 | Mayr ....................... F16B 13/12 |
| | | | 411/54.1 |
| 6,012,358 A | | 1/2000 | Lins et al. |
| 7,744,320 B2 | * | 6/2010 | Kobetsky ............. F16B 13/065 |
| | | | 411/60.1 |
| 7,811,038 B2 | | 10/2010 | Kobetsky et al. |
| 8,302,276 B2 | | 11/2012 | Kobetsky et al. |
| 8,974,163 B2 | * | 3/2015 | Ricketts ............... F16B 13/063 |
| | | | 411/45 |
| 2002/0054805 A1 | | 8/2002 | Trine et al. |
| 2004/0096288 A1 | | 5/2004 | Haug et al. |
| 2007/0224015 A1 | | 9/2007 | Ayrle et al. |
| 2009/0021431 A1 | | 1/2009 | Reppe et al. |
| 2009/0214315 A1 | | 8/2009 | Kelly et al. |
| 2014/0079496 A1 | | 3/2014 | Cousineau et al. |

FOREIGN PATENT DOCUMENTS

| | | |
|---|---|---|
| CN | 2512933 Y | 9/2002 |
| CN | 1502015 A | 6/2004 |
| CN | 2866931 Y | 2/2007 |
| CN | 101042152 A | 9/2007 |
| CN | 101253337 A | 8/2008 |
| CN | 203189449 U | 9/2013 |
| DE | 2046341 A1 | 4/1972 |
| DE | 102004053255 A1 | 5/2006 |
| EP | 0308619 A1 | 3/1989 |
| EP | 0308620 A1 | 3/1989 |
| EP | 0365475 A2 | 4/1990 |
| EP | 0570170 A1 | 11/1993 |
| EP | 2029900 B1 | 9/2014 |
| WO | WO2007145753 A2 | 12/2007 |

* cited by examiner

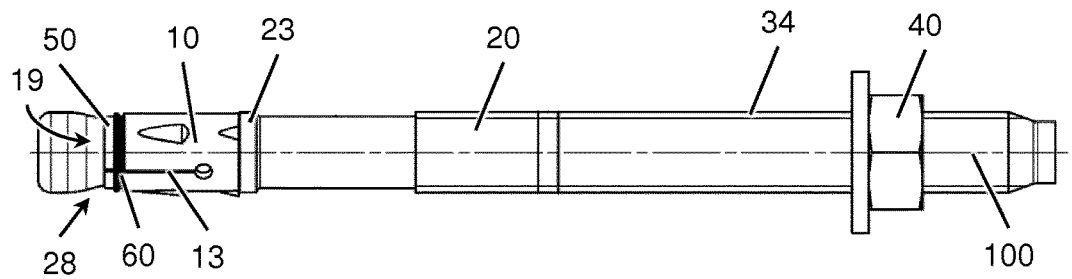
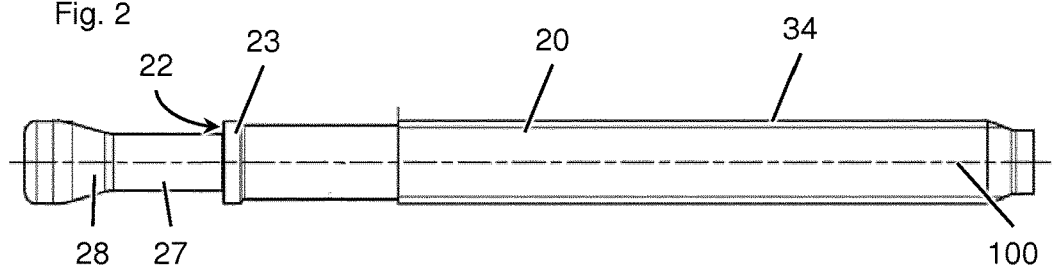
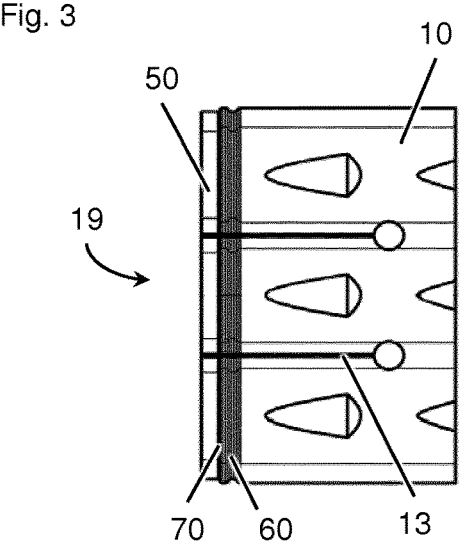 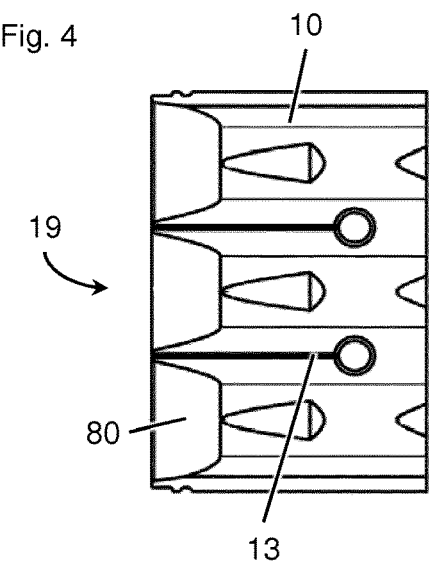
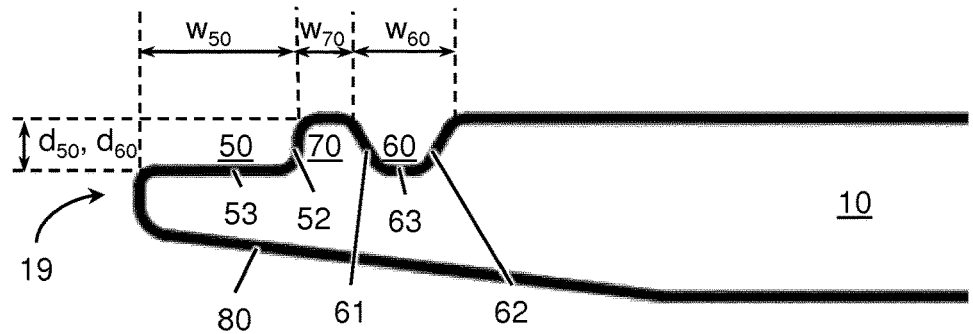

EXPANSION ANCHOR

The present invention relates to an expansion anchor. An expansion anchor of this type is equipped with an expansion sleeve for anchoring on a wall of a borehole and with an anchor bolt, which is guided through the expansion sleeve and which has an expansion area for expanding the expansion sleeve, in particular radially, the expansion sleeve having a first annular groove on its outside, which extends up to the front end face of the expansion sleeve facing the expansion area.

BACKGROUND

Generic DE 102004053255 A1 describes an expansion anchor, which includes an expansion body and an expansion sleeve, which is expandable by drawing the expansion body into the expansion sleeve, the expansion sleeve having a reduced wall thickness and a reduced outer dimension on a front edge facing the expansion body.

EP 2029900 A2 discloses an anchor, which has a plurality of annular grooves in the expansion sleeve. EP 0308619 A1 describes an expansion anchor, including an expansion sleeve, which has cutting teeth and an annular groove on its outside. Another expansion anchor having annular grooves in the expansion sleeve is derived from DE 2046341 A1, the annular grooves here being used to accommodate retaining rings.

EP 0365475 A2 describes an anchor, in which the expansion sleeve has an end-face bevel and a first annular groove situated a distance therefrom.

SUMMARY OF THE INVENTION

It is an object of the present invention to refine a generic expansion anchor in such a way that it is particularly reliable and powerful and, in particular, has particularly good load values, with little manufacturing complexity.

An expansion anchor according to the present invention is characterized in that the expansion sleeve has a second annular groove on its outside, and an annular ridge is situated between the first annular groove and the second annular groove.

One basic idea of the present invention may be seen in that a second annular groove is provided adjacent to and at a distance from the first annular groove, which is open toward the end face. A local reduction of the wall thickness of the expansion sleeve exists at this second annular groove. The second annular groove may thereby form a kind of joint, around which the first annular groove may swivel radially to the outside during the expansion operation, i.e. when the expansion area is drawn into the expansion sleeve, in such a way that the edges delimiting the first annular groove, and preferably also the groove base of the first annular groove, particularly effectively act against the borehole wall and may contribute, in particular, to the undercut formation in this location.

The front end face, up to which the first annular groove extends, faces the expansion area and faces away from a sleeve stop on the anchor bolt which may be present. Since the first annular groove extends up to the front end face of the expansion sleeve, the first annular groove is open toward the front end face of the expansion sleeve. This may involve, in particular, the first annular groove having only one single edge, namely a rear edge, which is formed at the transition between the first annular groove and the annular ridge. The second annular groove, however, may be delimited on two sides according to the present invention, i.e. it advantageously has a front edge, which is formed at the transition between the annular ridge and the second annular groove, as well as a rear edge opposite the first edge. The different edges are present, in particular, in a longitudinal section of the expansion sleeve.

The expansion sleeve may include one or multiple expansion slots, which preferably run in the longitudinal direction and which may divide the expansion sleeve into expansion tabs and which may also penetrate the two annular grooves. The two grooves preferably run in parallel to each other, which may ensure a particularly uniform introduction of force and also have manufacturing advantages. In particular, the second annular groove may be separated from the first annular groove by the annular ridge.

The expansion sleeve and/or the anchor bolt is/are preferably made from a metal material. The expansion sleeve is advantageously formed as a single piece, and or the anchor bolt is formed as a single piece.

In the expansion area, the anchor bolt tapers toward the rear, in the direction of the possibly present sleeve stop, i.e. the cross section of the anchor bolt increases toward the front in the expansion area. In the non-expanded initial state of the expansion anchor, the expansion sleeve is situated between the expansion area and the sleeve stop, at least in areas. In the set state of the expansion anchor, the expansion area is drawn into the expansion sleeve. The expansion area may have, for example, a conical design, at least in areas, and thus also be referred to as an expansion cone. By axially displacing the expansion area relative to the expansion sleeve, preferably together with the anchor bolt, the expansion area of the anchor bolt may be drawn into the expansion sleeve, and the expansion sleeve may be expanded radially for anchoring in the borehole. It is particularly preferred that the expansion area is situated closer to the end of the anchor bolt than the sleeve stop. The borehole may be formed, in particular, in a concrete substrate. The borehole wall, with which the expansion sleeve comes into contact and on which it is anchored, may preferably have an approximately cylindrical design.

In reference to the axial direction and the radial direction, this may relate, in particular, to the longitudinal axis of the anchor bolt. The inside of the expansion sleeve may be understood to be, in particular, the side facing the anchor bolt, and the outside of the expansion sleeve may be understood to be the side facing away from the anchor bolt.

It is particularly preferred that the annular ridge has a smaller width than the first annular groove and/or a smaller width than the second annular groove. Alternatively or additionally, the distance of the second annular groove from the front end face of the expansion sleeve may be less than twice the distance of the annular ridge from the front end face of the expansion sleeve. According to these specific embodiments, the annular ridge is comparatively narrow, so that the second annular groove is situated comparatively close to the first annular groove. As a result, the two annular grooves may particularly effectively interact during the expansion process, so that the performance of the anchor may be increased even further. In reference to the width, this may be measured, in particular, in the longitudinal direction of the expansion anchor, i.e. in the longitudinal section of the expansion sleeve, the edges preferably being assigned to the particular grooves and not to the connecting piece.

Another preferred embodiment is that the first annular groove has a greater width than the second annular groove. Accordingly, the second annular groove is comparatively narrow. The annular grooves are thus particularly effectively adapted to their particular functionality, so that the performance of the anchor may be increased even further while minimizing the material usage.

It may furthermore be provided that the first annular groove has a cylindrical groove base, and/or the second annular groove has a cylindrical groove base. This may have functional and manufacturing advantages, in particular if the two grooves are formed in a longitudinal rolling process, in which the rotation axis of the forming rolls runs perpendicularly to the grooves.

Additionally or alternatively, it may be provided that the first annular groove and the second annular groove have the same depth. This may also have manufacturing and functional advantages.

The second annular groove advantageously has at least one beveled edge, in particular two beveled edges. A beveled edge may be understood to be, in particular, an edge which runs at an angle other than 90° with respect to the groove base and/or the sleeve outer wall in the longitudinal section. The functionality and reliability may be improved even further thereby, since a reliable joint function may be implemented even using second annular grooves having comparatively small volumes. The two edges may enclose, for example, a 60° angle.

Another advantageous embodiment is that the expansion sleeve has a bevel on its inside, due to which the wall thickness of the expansion sleeve decreases toward the front end face of the expansion sleeve. The bevel preferably extends up to the front end face of the expansion sleeve. This may be advantageous, in particular with regard to the friction behavior between the expansion area and the expansion sleeve. The two annular grooves are suitably situated in the area of the bevel, viewed from the longitudinal section of the expansion sleeve. The two annular grooves are preferably covered by the bevel in the axial direction, i.e. in the longitudinal direction of the anchor.

It is furthermore preferred that the anchor bolt has a male thread, on which a nut having a female thread corresponding to the male thread is situated.

The nut may be used in the usual manner to fix an attachment part on the anchor bolt in a form-fitting manner. However, the nut may form a helical gear together with the male thread of the anchor bolt, which converts a rotation of the nut into an axial movement, via which the expansion area, in turn, is drawn into the expansion sleeve, and the expansion sleeve is able to be expanded.

The anchor bolt may preferably include a sleeve stop, which limits an axial displacement of the expansion sleeve away from the expansion area. In this case, the anchor may be designed as a so-called bolt anchor. In particular, the expansion area may be formed as a single piece with the rest of the anchor bolt in this case. However, the expansion sleeve may also extend up to the male thread of the anchor bolt. In this case, the anchor may be designed as a so-called sleeve anchor. In particular, the expansion area may be connected to the rest of the anchor bolt via a screw thread in this case. The sleeve stop may preferably be formed by a circular ring. The sleeve stop may be formed, for example, on an annular ridge which encompasses the anchor bolt on the outside.

The grooves may preferably be formed in a longitudinal rolling process, in which a forming tool is moved in parallel to the front edge of the sleeve blank.

BRIEF DESCRIPTION OF THE DRAWINGS

The present invention is explained in greater detail below on the basis of preferred exemplary embodiments, which are represented schematically in the attached figures, it being possible, in principle, to implement individual features of the exemplary embodiments illustrated below individually or in an arbitrary combination within the scope of the present invention. The following are illustrated schematically:

FIG. 1 shows a side view of an expansion anchor according to the present invention;

FIG. 2 shows a side view of the anchor bolt of the expansion anchor from FIG. 1, without an expansion sleeve and without a nut;

FIG. 3 shows a developed view of the expansion sleeve of the expansion anchor from FIG. 1, viewed in the direction toward the outside of the expansion sleeve;

FIG. 4 shows a developed view of the expansion sleeve of the expansion anchor from FIG. 1, viewed in the direction toward the inside of the expansion sleeve; and FIG. 5 shows a longitudinal sectional view of the front area of the expansion sleeve of the expansion anchor from FIG. 1.

DETAILED DESCRIPTION

The figures show an exemplary embodiment of an expansion anchor according to the present invention. The anchor includes an anchor bolt 20 and an expansion sleeve 10, expansion sleeve 10 surrounding anchor bolt 20 in an annular manner. Anchor bolt 20 includes a neck area 27, which has an approximately constant cross section and, in the front end area of anchor bolt 20 the latter has an expansion area 28 for expansion sleeve 10 in the junction to neck area 27, in which anchor bolt 20 expands from neck area 27 toward its front end, i.e. in which the cross section of anchor bolt 20 preferably continuously increases for the purpose of expanding expansion sleeve 10 toward the front. Anchor bolt 20 may preferably have a conical design in expansion area 28. Anchor bolt 20 furthermore includes a sleeve stop 22, designed, for example, as a circular ring, which limits an axial movement of expansion sleeve 10 toward the rear end of anchor bolt 20, i.e., away from expansion area 28. Sleeve stop 22 is formed on an annular shoulder 23, which encompasses anchor bolt 20.

In its rear end area opposite expansion area 28, anchor bolt 20 has a male thread 34, on which a nut 40 having a corresponding female thread is situated.

Expansion sleeve 10 includes multiple expansion slots 13, which extend into expansion sleeve 10 from front end face 19 of expansion sleeve 10, which faces expansion area 28. Expansion tabs are formed between these expansion slots 13.

In the area of its front end face 19 located on the left in FIGS. 1, 3, 4 and 5, expansion sleeve 10 has a first annular groove 50 on its outside, i.e. on the side facing away from anchor bolt 20. First annular groove 50 is open toward front end face 19 of expansion sleeve 10 and has only a single edge, namely a rear edge 52, in the longitudinal section. Groove base 53 of first annular groove 50 has an approximately cylindrical design. In addition, expansion sleeve 10 has a second annular groove 60 on its outside. An annular ridge 70 is formed between first annular groove 50 and second annular groove 60. Second annular groove 60 has a cylindrical groove base 63, which is delimited by a front edge 61 and a rear edge 62. Both edges are beveled and, in the illustrated exemplary embodiment, run at a 30° angle with respect to longitudinal axis 100 of the anchor.

Width $w_{70}$ of annular ridge 70 is smaller than width $w_{50}$ of first annular groove 50 and smaller than width $w_{60}$ of second annular groove 60. Width $w_{50}$ of first annular groove 50 is greater than width $w_{60}$ of second annular groove 60. Depth $d_{50}$ of first annular groove 50 is equal to depth $d_{60}$ of second annular groove 60. Width w is measured according to usual practice in parallel to longitudinal axis 100 of the anchor, and depth d is measured perpendicularly thereto.

On its inside, i.e. on the side facing anchor bolt 20, expansion sleeve 10 has a bevel 80, which extends up to front end face 19 of expansion sleeve 10 and on which basis the wall thickness of expansion sleeve 10 decreases toward front end face 19. Viewed in the longitudinal section of expansion sleeve 10, the two grooves 50, 60 and connecting piece 70, on the one hand, and bevel 80, on the other hand, are situated on opposite sides of expansion sleeve 10, bevel 80 axially overlapping the two grooves 50, 60 and connecting piece 70. Bevel 80 faces expansion area 28 of anchor bolt 20, so that expansion area 28 is able to act against bevel 80.

When setting the expansion anchor, anchor bolt 20 is inserted into a borehole in the direction of longitudinal axis 100 of the expansion anchor, leading with expansion area 28. Due to sleeve stop 22, which blocks a displacement of expansion sleeve 10 toward the rear end of anchor bolt 20, expansion sleeve 10 is also introduced into the borehole. Anchor bolt 20 is thus extracted a short distance out of the borehole, for example by tightening nut 40. Due to its friction with the borehole wall, expansion sleeve 10 remains behind, and an axial displacement of anchor bolt 20 relative to expansion sleeve 10 occurs, during the course of which expansion area 28 of anchor bolt 20 penetrates ever deeper into expansion sleeve 10 in such a way that expansion sleeve 10 is expanded radially by expansion area 28 of anchor bolt 20 and pressed against the wall of the borehole. Due to this mechanism, the expansion anchor is fixed in the substrate. When expansion sleeve 10 expands, front, first annular groove 50 is able to tilt around second annular groove 60, so that groove base 53 of first annular groove 50 is able to act particularly effectively against the wall of the borehole. In particular, undercuts in the wall of the borehole may be formed on the front edge of first annular groove 50 and/or on the edge between connecting piece 70 and rear edge 52 of first annular groove 50. An attachment part may be fixed on the anchor and thus on the substrate with the aid of nut 40.

What is claimed is:

1. An expansion anchor comprising:
   an expansion sleeve for anchoring on a wall of a borehole; and
   an anchor bolt guided through the expansion sleeve and having an expansion area for expanding the expansion sleeve;
   the expansion sleeve having a first annular groove on an outside, the first annular groove extending up to a front end face of the expansion sleeve facing the expansion area, the expansion sleeve having a second annular groove on the outside, an annular ridge being situated between the first annular groove and the second annular groove; wherein the annular ridge has a smaller width than the first annular groove and a smaller width than the second annular groove, and the first annular groove having a greater width than the second annular groove.

2. An expansion anchor comprising:
   an expansion sleeve for anchoring on a wall of a borehole; and
   an anchor bolt guided through the expansion sleeve and having an expansion area for expanding the expansion sleeve;
   the expansion sleeve having an inner circumferential surface facing the anchor bolt, and an outer circumferential surface facing outwardly, the expansion sleeve extending between a front end face facing the expansion area and a rear end face away from the expansion area, the expansion sleeve defining a grooved section at the front end face and a primary annular section next to the grooved section away from the front end face, the primary annular section having a first thickness between the inner circumferential surface and the outer circumferential surface;
   the expansion sleeve having a first annular groove on an outside of the grooved section, the first annular groove extending up to a front end face of the expansion sleeve facing the expansion area, the expansion sleeve having a second annular groove on the outside, an annular ridge being situated between the first annular groove and the second annular groove;
   the first annular groove having a first annular groove base, and the second annular groove having a second annular groove base, a first annular groove thickness between the first annular groove base and the inner circumferential surface and a second annular groove thickness between the first annular groove base and the inner circumferential surface being less than the first thickness.

3. The expansion anchor as recited in claim 2 wherein the expansion sleeve has a bevel on an inside, the first annular groove thickness being smaller than the second annular groove thickness due to the bevel.

4. The expansion anchor as recited in claim 3 wherein the first annular groove and the second annular groove have the same depth.

5. The expansion anchor as recited in claim 2 wherein the outer circumference surface of the primary annular section has an outer diameter larger than the first annular groove base and the second annular groove base.

6. The expansion anchor as recited in claim 2 wherein the outer circumference surface of the primary annular section has a same diameter as the annular ridge.

7. An expansion anchor comprising:
   an expansion sleeve for anchoring on a wall of a borehole; and
   an anchor bolt guided through the expansion sleeve and having an expansion area for expanding the expansion sleeve;
   the expansion sleeve having an inner circumferential surface facing the anchor bolt, and an outer circumferential surface facing outwardly, the expansion sleeve extending between a front end face facing the expansion area and a rear end face away from the expansion area, the expansion sleeve defining a grooved section at the front end face and a primary annular section next to the grooved section away from the front end face, the primary annular section having an outer circumferential surface with a primary outer diameter;
   the expansion sleeve having a first annular groove on an outside of the grooved section, the first annular groove extending up to a front end face of the expansion sleeve facing the expansion area, the expansion sleeve having a second annular groove on the outside, an annular ridge being situated between the first annular groove and the second annular groove;
   the first annular groove having a first annular groove base having a first annular groove base outer diameter, and the second annular groove having a second annular groove base having a second annular groove base outer diameter, the first annular groove base outer diameter and the second annular groove outer diameter being less than the primary outer diameter.

8. The expansion anchor as recited in claim 7 wherein the annular ridge has an outer ridge diameter the same as the primary outer diameter.

\* \* \* \* \*